(12) United States Patent
Jha et al.

(10) Patent No.: US 12,536,476 B2
(45) Date of Patent: Jan. 27, 2026

(54) AUTOMATED COMMUNICATION DATA SUMMARIZATION USING ARTIFICIAL INTELLIGENCE TECHNIQUES

(71) Applicant: Dell Products L.P., Round Rock, TX (US)

(72) Inventors: Saurabh Jha, Bangalore (IN); Sailendu Kumar Patra, Bangalore (IN); Guhesh Swaminathan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 357 days.

(21) Appl. No.: 17/742,742

(22) Filed: May 12, 2022

(65) Prior Publication Data
US 2023/0368080 A1 Nov. 16, 2023

(51) Int. Cl.
*G06N 20/20* (2019.01)
*G06F 16/34* (2025.01)
(Continued)

(52) U.S. Cl.
CPC .......... *G06N 20/20* (2019.01); *G06F 16/345* (2019.01); *G06F 40/166* (2020.01); *G06F 40/279* (2020.01); *G06F 40/40* (2020.01)

(58) Field of Classification Search
CPC ..... G06N 20/20; G06F 16/345; G06F 40/279; G06F 40/166; G06F 40/40
See application file for complete search history.

(56) References Cited

U.S. PATENT DOCUMENTS 9,286,290 B2 * 3/2016 Allen .................... G06F 40/205
9,378,200 B1 6/2016 Cohen et al.
(Continued)

OTHER PUBLICATIONS

Tsai, Bing-Hong, Yao-Chung Fan, and Fang-Yie Leu, "Extractive Summarization by Rouge Score Regression Based on BERT", 2021, Proceedings of the 14th International Conference on Complex, Intelligent and Software Intensive Systems (CISIS-2020), pp. 156-165. (Year: 2021).*

(Continued)

*Primary Examiner* — Daniel C Washburn
*Assistant Examiner* — James Boggs
(74) *Attorney, Agent, or Firm* — Ryan, Mason & Lewis, LLP

(57) ABSTRACT

Methods, apparatus, and processor-readable storage media for automated communication data summarization using artificial intelligence techniques are provided herein. An example computer-implemented method includes identifying one or more words relevant to one or more predefined tasks by processing input communication data using a first set of one or more artificial intelligence techniques; extracting, based at least in part on the identifying of the one or more words, multiple portions of the input communication data into individual sub-portions of the input communication data; generating at least one summarization of the input communication data based at least in part on processing the sub-portions of the input communication data using a second set of one or more artificial intelligence techniques; and performing one or more automated actions based at least in part on the at least one summarization of the input communication data.

15 Claims, 9 Drawing Sheets

(51) Int. Cl.
  *G06F 40/166* (2020.01)
  *G06F 40/279* (2020.01)
  *G06F 40/40* (2020.01)

(56) References Cited

U.S. PATENT DOCUMENTS

| | | | |
|---|---|---|---|
| 9,672,279 B1 | 6/2017 | Cohen et al. | |
| 10,127,304 B1 | 11/2018 | Cohen et al. | |
| 10,235,452 B1 | 3/2019 | Savir et al. | |
| 10,803,399 B1 | 10/2020 | Cohen et al. | |
| 10,868,785 B2* | 12/2020 | Hosseinisianaki | G06N 3/044 |
| 11,294,946 B2* | 4/2022 | Rawat | G06F 40/30 |
| 11,403,465 B2* | 8/2022 | Matthews | G06N 5/04 |
| 11,481,425 B2* | 10/2022 | Wang | G06N 3/045 |
| 11,481,542 B2* | 10/2022 | Upadhyay | H04L 51/046 |
| 11,640,420 B2* | 5/2023 | Beaugh | G06F 40/117 |
| | | | 715/254 |
| 11,983,502 B2* | 5/2024 | Shah | G06F 40/40 |
| 12,001,951 B2* | 6/2024 | V V Ganeshan | G06F 40/289 |
| 2017/0161372 A1* | 6/2017 | Fernández | G06F 40/211 |
| 2018/0176163 A1* | 6/2018 | Arquero | G06F 40/30 |
| 2023/0252054 A1* | 8/2023 | Hou | G06F 16/287 |
| | | | 707/603 |

OTHER PUBLICATIONS

Cao, Yue, Xiaojun Wan, Jin-ge Yao, and Dian Yu, "MultiSumm: Towards a Unified Model for Multi-Lingual Abstractive Summarization", Apr. 2020, Proceedings of the AAAI Conference on Artificial Intelligence (AAAI-20), vol. 34, No. 01, pp. 11-18. (Year: 2020).*

Yadav, Divakar, Jalpa Desai, and Arun Kumar Yadav. "Automatic Text Summarization Methods: A Comprehensive Review", Mar. 2022, arXiv preprint arXiv:2204.01849. (Year: 2022).*

Biswas, Pratik K., and Aleksandr Iakubovich, Apr. 2021, "Extractive Summarization of Call Transcripts", arXiv preprint arXiv:2103.10599. (Year: 2021).*

Gupta, Hritvik, and Mayank Patel, "Method of Text Summarization Using LSA and Sentence Based Topic Modelling with BERT", Mar. 2021, Proceedings of the 2021 International Conference on Artificial Intelligence and Smart Systems (ICAIS-2021), pp. 511-517. (Year: 2021).*

Mukherjee, Sudipto, Subhabrata Mukherjee, Marcello Hasegawa, Ahmed Hassan Awadallah, and Ryen White, "Smart To-Do: Automatic Generation of To-Do Items from Emails", Jul. 2020, Proceedings of the 58th Annual Meeting of the Association for Computational Linguistics, pp. 8680-8689. (Year: 2020).*

Bharti, Santosh Kumar, Korra Sathya Babu, and Anima Pradhan, "Automatic Keyword Extraction for Text Summarization in Multi-document e-Newspapers Articles", Jul. 2017, European Journal of Advances in Engineering and Technology, vol. 4, No. 6, pp. 410-427. (Year: 2017).*

Mridha, M. F., Aklima Akter Lima, Kamruddin Nur, Sujoy Chandra Das, Mahmud Hasan, and Muhammad Mohsin Kabir, "A Survey of Automatic Text Summarization: Progress, Process and Challenges", Nov. 2021, IEEE Access, vol. 9, pp. 156043-156070. (Year: 2021).*

Liu, Yang, and Mirella Lapata, "Hierarchical Transformers for Multi-Document Summarization", Jul. 2019, Proceedings of the 57th Annual Meeting of the Association for Computational Linguistics, pp. 5070-5081. (Year: 2019).*

Wikipedia, Robotic process automation, https://en.wikipedia.org/w/index.php?title=Robotic_process_automation&oldid=1084045031, Apr. 22, 2022.

Wikipedia, ABBYY Fine Reader, https://en.wikipedia.org/w/index.php?title=ABBYY_FineReader&oldid=1082321823, Apr. 12, 2022.

Wikipedia, Alteryx, https://en.wikipedia.org/w/index.php?title=Alteryx&oldid=1078943432, Mar. 24, 2022.

Wikipedia, Microsoft Azure, https://en.wikipedia.org/w/index.php?title=Microsoft_Azure&oldid=1085299553, Apr. 29, 2022.

Entrinsik.com, https://entrinsik.com/informer/, May 5, 2022.

Wikipedia, Long short-term memory, https://en.wikipedia.org/w/index.php?title=Long_short-term_memory&oldid=1085879235, May 2, 2022.

Wikipedia, Autoregressive integrated moving average, https://en.wikipedia.org/w/index.php?title=Autoregressive_integrated_moving_average&oldid=1086361303, May 5, 2022.

Nishida, K., Exploratory.io, An Introduction to Time Series Forecasting with Prophet in Exploratory, Apr. 12, 2017.

Rigby, J., TowardsDataScience.com, AddressNet: How to build a robust street address parser using a Recurrent Neural Network, Dec. 5, 2018.

Github.com, Libpostal, https://github.com/openvenues/libpostal, May 5, 2022.

* cited by examiner

FIG. 6

```
Input: Sentence-wise split email text
Output: Sentence Score/Summary
1.  For each sentence in the email perform:
2.      Word tokenization on each sentence
3.      For each word in each sentence:
4.          Check if word present in Keyword Dictionary - If yes, set sentence score as 1
5.          If step 4 is no, check if embeddings of word are close to embeddings of any of the keywords -
            If yes, set sentence score as 1 -If no, Continue
6.      End for
7.  For each sentence without any score perform:
8.      BERT-embedded Vector Quantization Algorithm generating scores for each sentence
9.  End for
10. Based on the total number of sentences in the Email, a summary based on list of top sentences is generated
11. Return Sentence Score/Summary
```

Input: Sentence-wise split email text
Output: Sentence Score
1. For each sentence in the email:
2.     Compute BERT embeddings using Distil_BERT
3. End for
4. Formation of Clusters using K-Means technique based on the BERT embeddings
5. For each cluster:
6.     Compute the Centroid
7.     For each sentence in each cluster:
8.         Set sentence score based on the distance between sentence and centroid
9. End for
10. Return Sentence Score

AUTOMATED COMMUNICATION DATA SUMMARIZATION USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for communication data processing using such systems.

BACKGROUND

In enterprise contexts, conversations between enterprise teams, users and/or clients commonly play a significant role in carrying out a variety of tasks (e.g., transactions, processes, etc.). Such conversations can include formal communications (e.g., through a predefined channel) and/or informal communications (e.g., through chat engines, voice messages, etc.), and processing such communications in furtherance of carrying out one or more tasks can present challenges. Conventional communication processing techniques, however, are often error-prone and resource-intensive.

SUMMARY

Illustrative embodiments of the disclosure provide automated communication data summarization using artificial intelligence techniques. An exemplary computer-implemented method includes identifying one or more words relevant to one or more predefined tasks by processing input communication data using a first set of one or more artificial intelligence techniques, and extracting, based at least in part on the identifying of the one or more words, multiple portions of the input communication data into individual sub-portions of the input communication data. The method also includes generating at least one summarization of the input communication data based at least in part on processing the sub-portions of the input communication data using a second set of one or more artificial intelligence techniques, and performing one or more automated actions based at least in part on the at least one summarization of the input communication data.

Illustrative embodiments can provide significant advantages relative to conventional communication processing techniques. For example, problems associated with error-prone and resource-intensive techniques are overcome in one or more embodiments through automatically generating communication data summarizations using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 6 shows example pseudocode for bidirectional encoder representation from transformers-based (BERT-based) ensembled scoring algorithm in an illustrative embodiment.

FIG. 7 shows example pseudocode for a BERT-embedded vector quantization compression technique in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
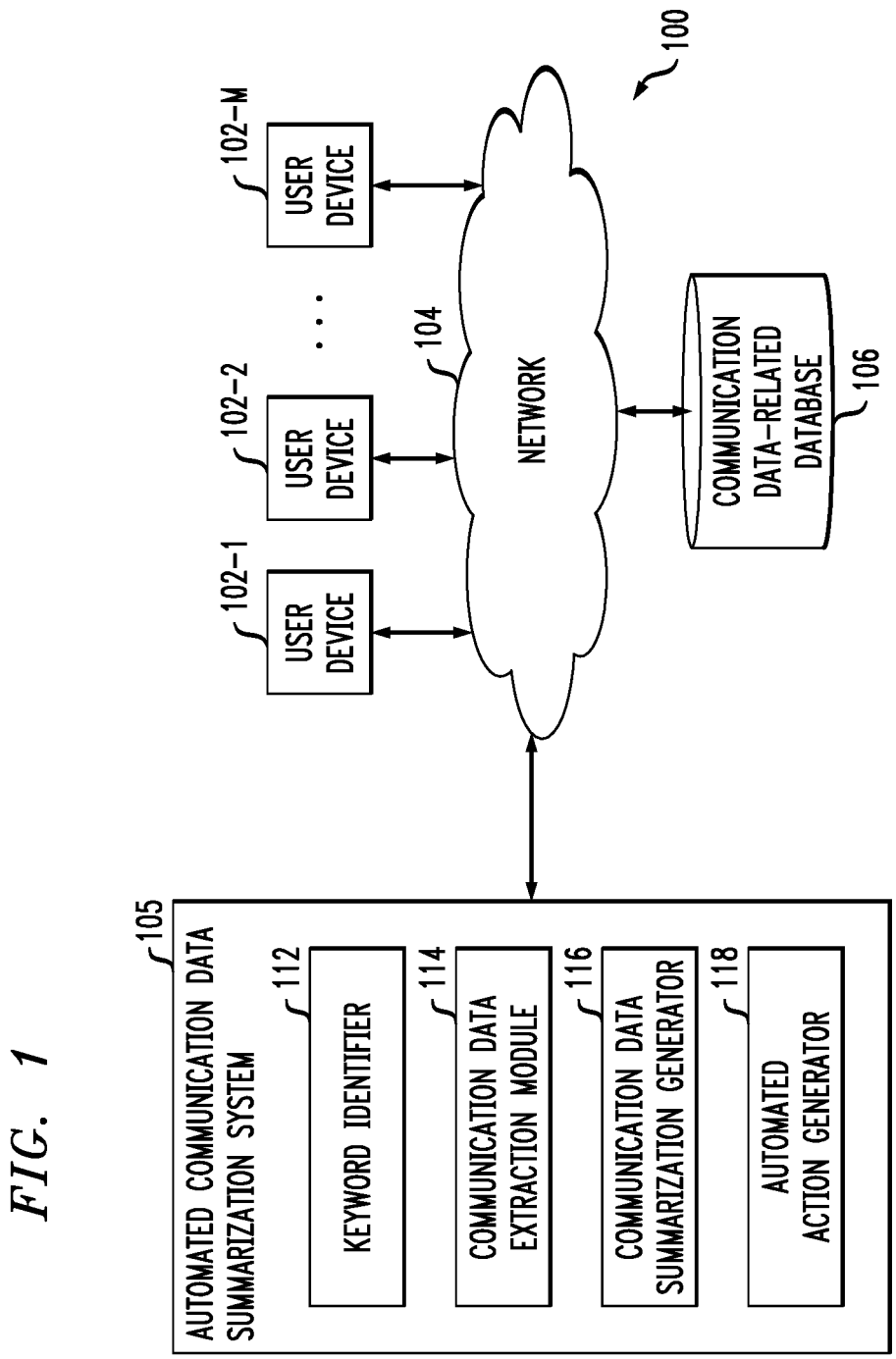
FIG. 1 shows an information processing system configured for automated communication data summarization using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated communication data summarization system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi® or WiMAX™ network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated communication data summarization system 105 can have an associated communication data-related database 106 configured to store data pertaining to various user communications, which comprise, for example, text data (e.g., email data, transcribed phone data, etc.), tabular data, multi-language data, etc.

The communication data-related database 106 in the present embodiment is implemented using one or more storage systems associated with automated communication data summarization system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated communication data summarization system 105 are one or more input-output devices, which illustratively comprise keyboards, displays or other types of input-output devices in any combination. Such input-output devices can be used, for example, to support one or more user interfaces to automated communication data summarization system 105, as well as to support communication between automated communication data summarization system 105 and other related systems and devices not explicitly shown.

Additionally, automated communication data summarization system 105 in the FIG. 1 embodiment is assumed to be implemented using at least one processing device. Each such processing device generally comprises at least one processor and an associated memory, and implements one or more functional modules for controlling certain features of automated communication data summarization system 105.

More particularly, automated communication data summarization system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated communication data summarization system 105 to communicate over the network 104 with the user devices 102, and illustratively comprises one or more conventional transceivers.

The automated communication data summarization system 105 further comprises keyword identifier 112, communication data extraction module 114, communication data summarization generator 116, and automated action generator 118.

It is to be appreciated that this particular arrangement of elements 112, 114, 116 and 118 illustrated in the automated communication data summarization system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automated communication data summarization using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated communication data summarization system 105 and communication data-related database 106 can be on and/or part of the same processing platform.

An exemplary process utilizing elements 112, 114, 116 and 118 of an example automated communication data summarization system 105 in computer network 100 will be described in more detail with reference to the flow diagram of FIG. 8.

Accordingly, at least one embodiment includes automated multi-lingual communication summarization using one or more BERT-based ensembled scoring algorithms (such as further detailed in connection with FIG. 6). As detailed herein, such a BERT-based ensembled scoring algorithm can include a transformer based artificial intelligence technique for natural language processing.

In at least one embodiment, the ensembled score algorithm is based at least in part on word frequency and topic modelling analysis performed on multiple multi-lingual email files. Such analysis can produce a dictionary of keywords which can include unigrams and bigrams selected using an automated keyword dictionary pipeline to assist the artificial intelligence-based algorithm. Also, such keywords can be given weights and tokenized sentences out of each email can be sorted based on the keyword weights corresponding to each sentence. This output can then be compared with a BERT-embedded vector quantization, a data compression technique (such as further detailed in connection with FIG. 7) to divide a dataset into groups based on vector distance, to generate a text summary of the entire email conversation (e.g., that transpired over multiple emails and/or email files).

One or more embodiments also includes analyzing tabular structure in email files and providing required output incorporating tabular information. In one or more embodiments, such required output can include an email summary which analyzes the text and the tabular portions available in the separate emails under consideration. Further, at least one embodiment can include implementation across multiple use cases and/or domains by modifying and/or updating the dictionary of keywords for each given use case and/or domain. Such an embodiment can also include extending one or more of the techniques for implementation with communication media beyond merely email, such as chat conversations, telephone conversations, transcriptions, etc.

By way merely of illustration and example, an embodiment implemented in connection with email communications can include obtaining and/or sharing a set of emails (e.g., representing a conversation between two or more users, an enterprise and one or more users, etc.) as one or more email files, also referred to herein as EML files and/or MSG files, (e.g., email messages saved by an email application). Along with such an EML file, one or more relevant and/or required documents (e.g., transaction documents, purchase order documents, etc.) can be obtained and/or shared for processing. As noted herein, such EML files (and/or other documents) can include multiple conversations or portions thereof, with varying degrees of relevance and/or importance across such communications. Also, the EML files may include the use of one or more languages, further adding complexity to any subsequent processing.

Accordingly, one or more embodiments include generating and/or implementing a multi-lingual communication summarizer which can be specific to conversations containing specific subject matter (e.g., particular types of transactions, etc.). Such an embodiment includes implementing a BERT-based scoring algorithm which is an ensemble incorporating a transformer-based architecture assisted by a dictionary of keywords formed from an email corpus processed using one or more machine learning techniques and/or one or more human-assisted machine intelligence processes.

In at least one embodiment, keyword dictionaries can be developed to ensure that various requirements from a given context and/or domain (e.g., an order booking perspective for customers, one or more transaction-specific use cases, etc.) are captured and stored in a structured mechanism for future processing by one or more artificial intelligence-based scoring algorithms. Each such dictionary can contain one or more sets of keywords which correspond to one or more context-dependent and/or domain-dependent themes (e.g., customer requirements and/or instructions). Such keywords can be used to process email files and/or email chains to detect relevant sentences present therein.

As further detailed herein, one or more embodiments include generating and/or implementing multiple mechanisms or components including a keyword component, an email processing component; and an ensembled text scoring algorithm.

Figure 2:
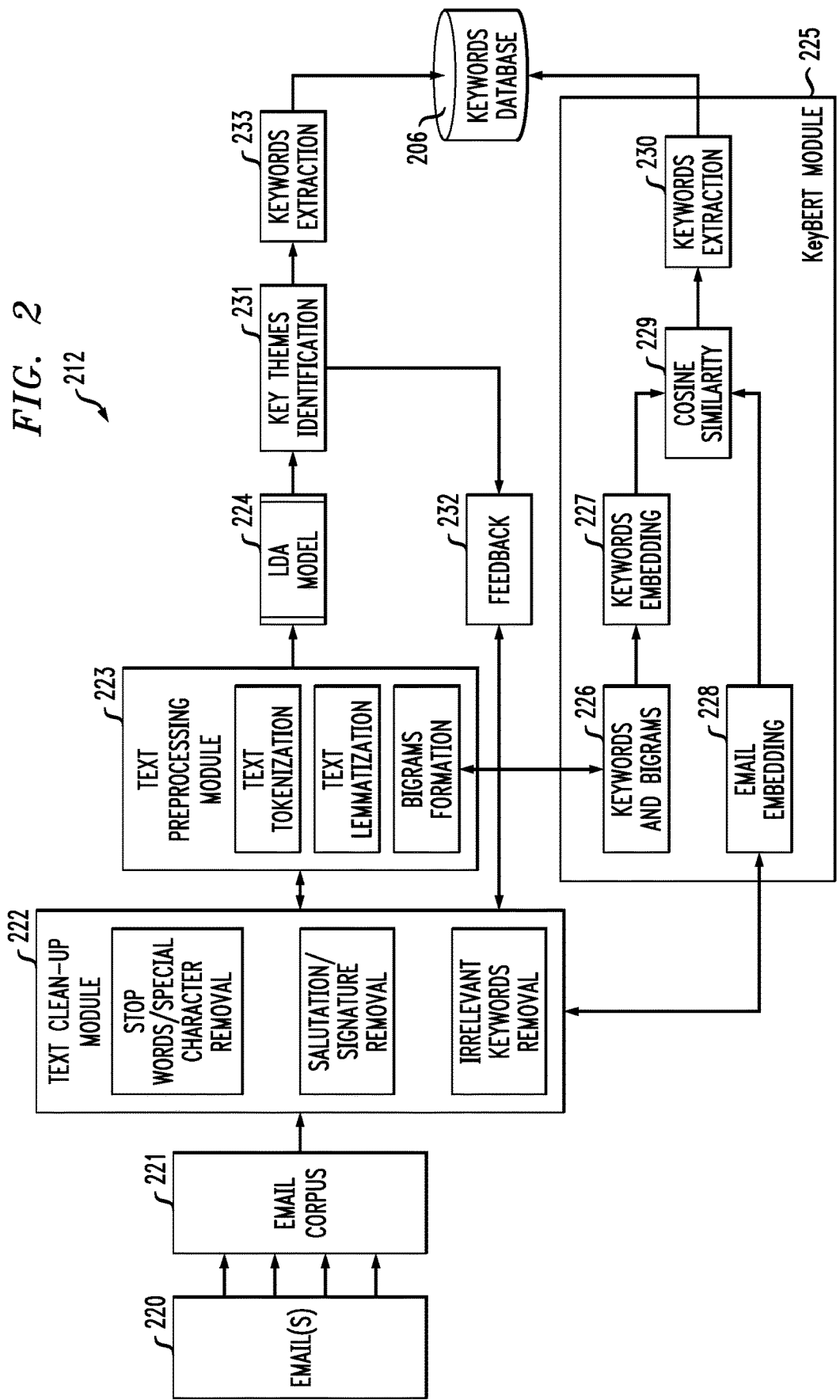
FIG. 2 shows an example workflow for keyword generation in an illustrative embodiment.

FIG. 2 shows an example workflow for keyword generation, carried out by keyword identifier 212, in an illustrative embodiment. In at least one embodiment, a keywords component is generated and/or implemented to automatically identify one or more keywords which are specific to conversations associated with a given context or domain (e.g., order processing conversations). Such a component sets the context for implementation of the summarization engine, and can include one or more modules, as further detailed herein. Such modules can include an email corpus 221 which includes a collection of EML files 220 distributed across different parameters (e.g., customer types, language of conversation, content subject matter, etc.).

Such modules can also include a dedicated text clean-up module 222, which removes one or more unnecessary and/or unwanted words from text (e.g., stop words, special characters, salutations, signatures, irrelevant keywords, etc.). In at least one embodiment, another such module includes a text preprocessing module 223, which tokenizes and lemmatizes one or more words, providing unigrams and bigrams for a keywords generation module. A keywords generation module can also include implementation of a latent Dirichlet allocation (LDA) model 224 (an example of a generative statistical method to allow datasets to be explained (e.g., with respect to similarity) using tokenized sentences) and keyBERT module 225 (an example of a keyword and/or phrase extraction methodology using BERT embeddings) which use the unigrams and bigrams along with the cleaned sentences to generate keywords which will represent the entire corpus.

Also, in one or more embodiments, using at least a portion of the generated keywords, a dictionary of keywords is formed (and stored in keywords database 206), using keywords generated by keyBERT module 225, key themes identification component 231, and keyword extraction component 233, taking into the consideration the frequency of occurrence of each keyword. A feedback loop 232 between keywords identified by latent Dirichlet allocation (LDA) model 224 and text clean-up module 222 can be utilized to improve the keyword dictionary, and at least one embodiment includes updating the dictionary by collecting new email files on a scheduled timeline to consider any new words therein (such as, for example, new products and/or services related to a given enterprise).

As noted above and as depicted in FIG. 2, keyBERT module 225 is used to generate keywords which are similar to the words available in the email corpus 221. Within keyBERT module 225, keywords and bigrams 226 include a list of tokenized words, from the text preprocessing module 223, which represents the essence of words present in the email corpus 221. Also, keyword embeddings 227 include BERT-based word embeddings implemented in connection with words (from keywords and bigrams 226) to find similar words from the email corpus 221. Email embeddings 228 are similar to keyword embeddings 227, but wherein entire email words are broken down into words and embedded to generate a comparable output using one or more distance methods. Relatedly, cosine similarity 229 is a distance-based measurement of similarity between two or more word embeddings, and this similarity measurement is carried out to obtain and/or determine one or more sets of keywords from the email corpus 221. Further, keyword extraction 230 generates a list of keywords using one or more post-processing steps on the list generated using elements 226,

227, 228 and 229. Such post-processing steps can include, for example, removal of repetition, cleaning, etc.

Figure 3:
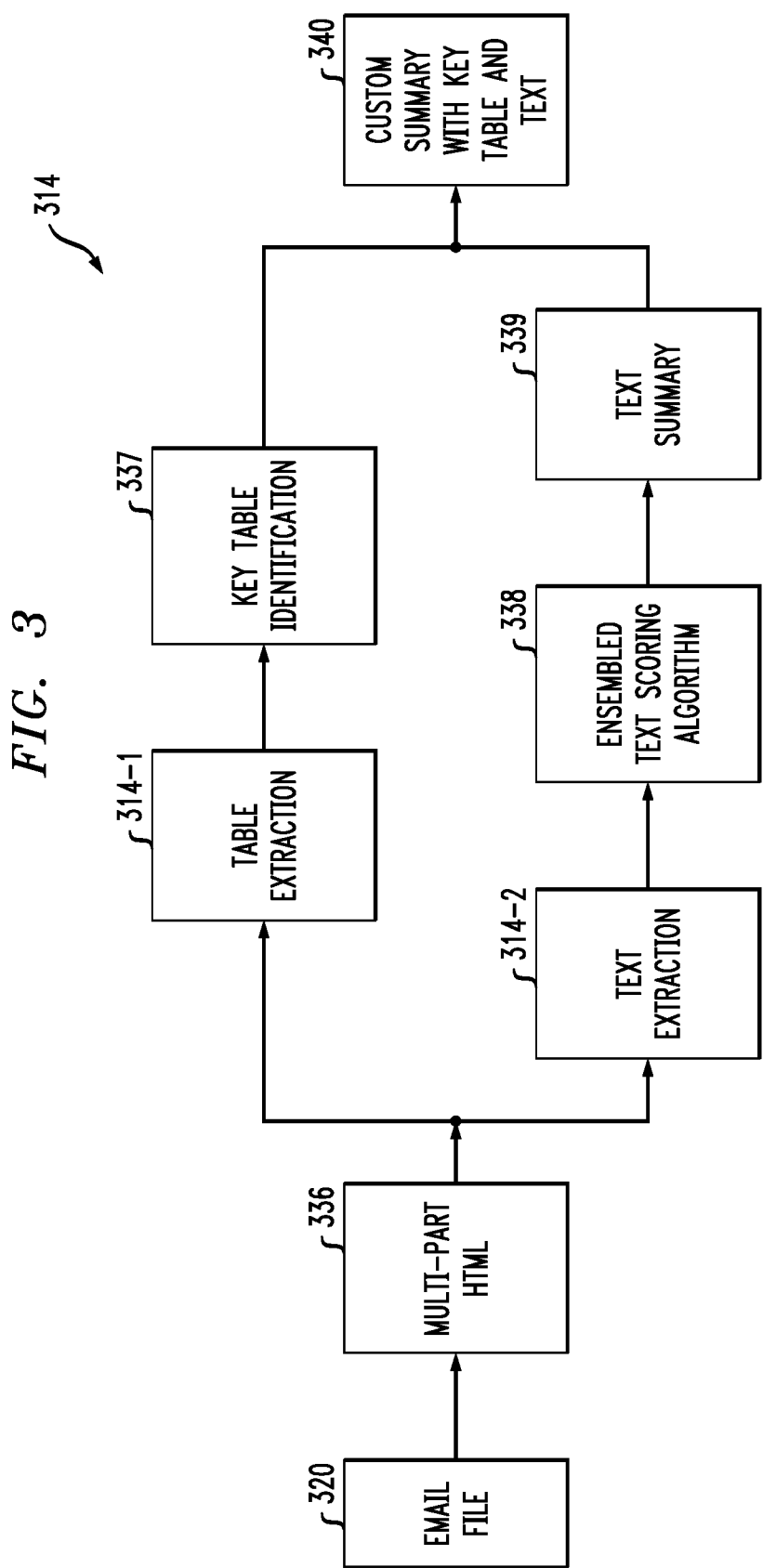
FIG. 3 shows an example workflow for email processing in an illustrative embodiment.

FIG. 3 shows an example workflow for email processing, carried out by communication data extraction module 314, in an illustrative embodiment. In one or more embodiments, an email processing component processes email files into a summary format which can include text and/or tables. By way of example, such a component can take one or more email files 320 (e.g., EML files and/or MSG files) as input, and convert the input email file(s) 320 into a multi-part hypertext markup language (HTML) format 336 using a multi-part content type conversion process. In one or more embodiments, a multi-part content type conversion process is carried out by extracting components such as text components and table components from the email file 320. Such a procedure can include the following: the email file 320, which is received by the algorithm if it is in a EML file format, is converted into an HTML format, and if the email file 320 is detected as an MSG file, using specific encoding, the MSG file is converted into an EML file (using one or more encoding techniques) and then converted to an HTML format. While such conversion takes place, a specific variable is included which is the multi-part content type and which is used to keep the text and table identifiable as distinct units to facilitate the extraction. Additionally, such conversion defines the email files (e.g., as containing multiple emails therein) and can take into consideration multiple data types inside each email (which, for example, can facilitate identifying tabular data inside the email files).

Subsequent to the multi-part HTML conversion, text data and table data present in a given HTML are extracted via components 314-1 and 314-2, respectively. In one or more embodiments, such an extraction process involves identifying table tags in the HTML file, and after the tables are extracted, removing the content within the table tags and generating the HTML as a text document to extract the text (e.g., using one or more Python libraries such as the Beautiful Soup library).

In one or more embodiments, table data can be split into separate cells in a line, which added noise to the data to be summarized. From the extracted table data, one or more items of significant table data are identified using key table identification component 337 based on the structure resemblance and content. In at least one embodiment, structure resemblance and content is enabled by providing a common set of table structures which is obtained through analysis on the given email corpus. The structure and content includes a list of row and column headers, which can be associated with (important) tables obtained during analysis carried out on the email corpus (which includes multiple (e.g., thousands of) unique email files).

Figure 4:
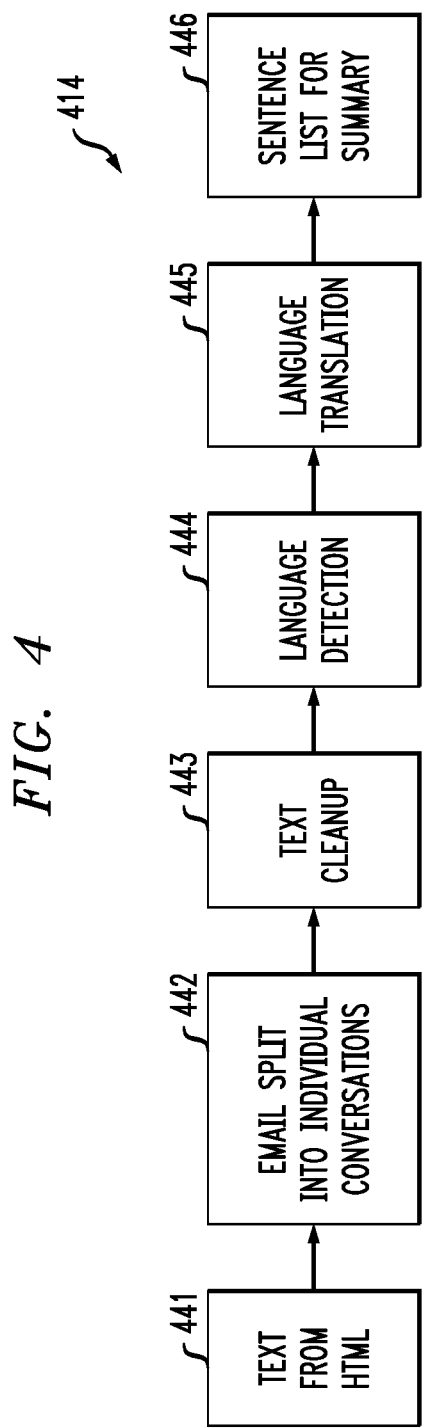
FIG. 4 shows an example workflow for text extraction in an illustrative embodiment.

As also depicted in FIG. 4, the extracted text data is processed using ensembled text scoring algorithm 338, the output of which is used to create a text summary 339, which can be combined with the identified table data 337 to produce a custom summarization 340.

FIG. 4 shows an example workflow for text extraction, carried out by communication data extraction module 414, in an illustrative embodiment. In one or more embodiments, text data can be extracted from HTML, format 441 and separated into individual emails and/or email conversations 442 to carry out text cleaning techniques 443. For example, at least a portion of these emails is cleaned inside a text extraction component to remove information such as, for example, email headers, salutations, signatures, footer messages, etc. At least a portion of the cleaned text is then processed using a sequence language model 444, which detects the presence of one or more languages in the text. Additionally, in one or more embodiments, a transformer-based translation model 445 can process such text to translate the text into one or more other languages and/or generate at least one sentence list 446 to assist the ensembled algorithm. The sentence list 446 can be used, for example, by an ensembled text scoring algorithm (such as further detailed in connection with FIG. 6) to generate a summary of the provided email text.

Figure 5:
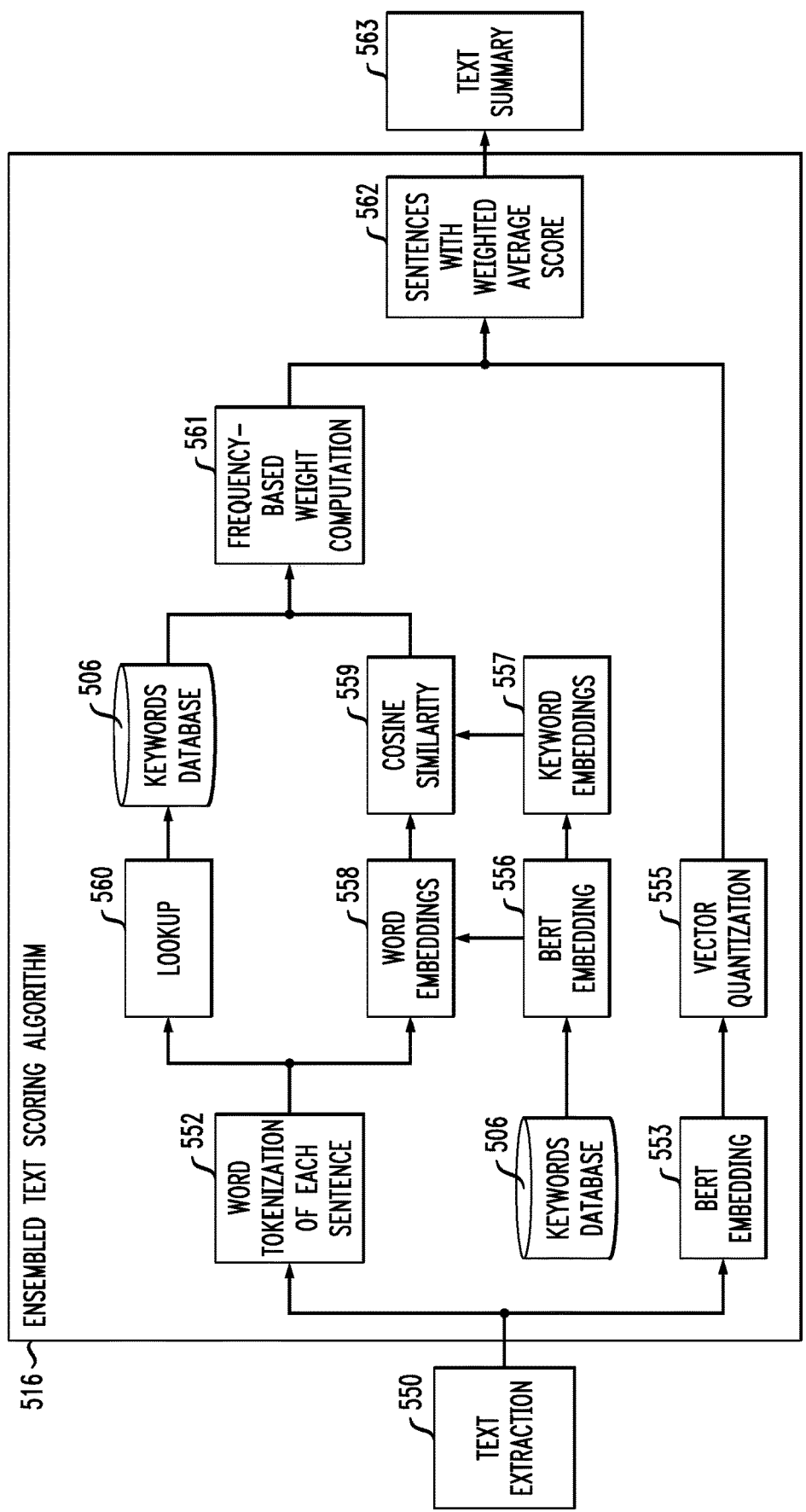
FIG. 5 shows an example workflow for an ensembled text scoring algorithm in an illustrative embodiment.

FIG. 5 shows an example workflow for an ensembled text scoring algorithm in an illustrative embodiment. In one or more embodiments, at least a portion of the cleaned text from the text extraction component 550 is provided as input to an ensembled text scoring algorithm 516, which analyzes and provides scores for each sentence in a given email conversation. Based on the given summary percentage (which can be defined, for example, as the overall percentage of compression to be performed on the given text), a text summary is formed from the text. The summary that is generated can include an extractive summarization with a corresponding scoring technique. In one or more embodiments, extractive summarization can include an artificial intelligence system learning and/or understanding the context of text which is to be summarized, and generating a summary with new phrases and/or sentences which are not part of the original text. Additionally or alternatively, in such an embodiment, extractive summarization can include generating an end result with the use of existing phrases and/or sentences available in the original text, wherein such a summary will exclude sentences and/or phrases which are similar to each other. Also, in at least one embodiment, the final summary is constructed by merging text and table data (if present), taking into consideration the original sequence of sentences from the given (email) file.

In one or more embodiments, ensembled text scoring algorithm 516 is implemented in connection with an email processing component, such as detailed above. The ensembled text scoring algorithm 516 processes extracted text tokenized into sentences 552 as input and provides the sentences with weighted average scores as output 562, which is utilized for the formation of at least one text summary block 563. In at least one embodiment, an ensembled text scoring algorithm 516 utilizes and/or encompasses multiple methodologies in generating an extraction-based summary from text. One such methodology can include implementing a lookup-based mechanism 560 on the tokenized sentences 552 using a keywords database 506 (such as described herein). This mechanism captures the sentences which are directly associated with the keyword dictionary 506 and weighs the sentences, using frequency-based weight computation 561, based at least in part on the frequency of keyword occurrence.

Another methodology can include utilizing a transformer-based word embedding component 558 and cosine similarity measure(s) 559. Such a mechanism can identify and/or process sentences which do not include any keyword dictionary keywords directly, but do include one or more words synonymous with one or more of the keywords. Such an embodiment can include embedding the tokenized words and the keywords using BERT-based contextualized word embeddings (e.g., component 558). By way of illustration, conventional word embedding models consider the static meaning or the direct meaning of a word for creating embeddings, and such embeddings do not distinguish between the exact meaning of the word and the contextual meaning of the same word in a given sentence. In contrast, BERT-based contextual word embeddings consider nearby words in the sentence before generating one or more word embeddings. Accordingly, referring again to FIG. 5, the embedded words, which can be in vector format, are compared using cosine similarity measures 559 to identify sentences with words similar to one or more of the keywords.

Yet another methodology can include implementing a vector quantization mechanism 555 to identify any potentially significant sentences in the text apart from those which were extracted using one or more of the above-noted methodologies. Using a BERT-based embedding architecture 553 (e.g., such as described above), one or more sentences are embedded and vector quantization mechanism 555 are applied to cluster similar sentences. In at least one embodiment, the vector quantization mechanism 555 used are based on a K-means based clustering technique, resulting in obtaining and/or generating one or more clusters of sentences to be used in generating a summary. At least one sentence out of each cluster can be selected based at least in part on distance to the centroid of each cluster.

In connection with FIG. 5, BERT embedding 556 includes a technique wherein a BERT model is used for the generation of one or more word embeddings, taking into consideration the context in which the word is used and/or present. Keyword embeddings 557 and transformer-based word embeddings 558 are respective outputs of the BERT embedding model implemented in connection with the keyword database and email word list, respectively.

Accordingly, in one or more embodiments, implementing one or more of the above-noted methodologies can provide weighted scores for processed sentences and a corresponding weighted average score. Based on the summary percentage (as detailed, for example, in connection with the email processing component), an extractive summary can be generated.

By way merely of illustration, consider the following use case example, wherein an EML file includes conversations between an enterprise entity (e.g., a sales agent) and customer confirming certain order-related information and instructions to be followed by an order processing team while booking the order. In accordance with an example embodiment, the EML file is converted into a multi-part HTML document from which the tables and the text are extracted. As a part of tabular data summarization, one or more significant tables are identified based at least in part on terminologies in the table (e.g., Customer Number, Quote Number, End User Details, Product Details, etc.).

In parallel, the text from the multi-part HTML document is extracted into a list of emails to facilitate the removal of content such as email headers, salutations, signatures, footer messages, etc. Upon clean-up of the text, the text list is processed using an ensembled text scoring algorithm, which includes tokenizing the text into sentences and words as required by one or more scoring methodologies to score each sentence. Based at least in part on the final weighted average score, a text summary is generated which incorporates information required by one or more users (e.g., the order processing team) in connection with one or more additional tasks (e.g., to process the order). Additionally, in an example embodiment, the text summary can be combined with the one or more identified significant tables to form an overall summary of the email file.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

FIG. 6 shows example pseudocode for a BERT-based ensembled scoring algorithm in an illustrative embodiment. In this embodiment, example pseudocode 600 is executed by or under the control of at least one processing system and/or device. For example, the example pseudocode 600 may be viewed as comprising a portion of a software implementation of at least part of automated communication data summarization system 105 of the FIG. 1 embodiment.

The example pseudocode 600 illustrates obtaining and/or receiving input in the form of sentence-wise split email text. For each sentence in the email, example pseudocode 600 includes performing word tokenization (on each sentence), and, for each word in each sentence, checking and/or determining if the word is present in the keyword dictionary and/or database. If yes, the sentence score is set as 1. If no, example pseudocode 600 further includes checking and/or determining if embeddings of the word are close to embeddings of any of the keywords. If yes, the sentence score is set as 1; if no, example pseudocode 600 continues as noted below. For each sentence without a score, example pseudocode 600 implements a BERT-embedded vector quantization algorithm (such as detailed, for example, in connection with FIG. 7), generating scores for each such sentence. Based on the total number of sentences in the given email, a summary, based on a list of top sentences is generated, and the corresponding sentence score and/or summary is output and/or returned (to at least one user).

It is to be appreciated that this particular example pseudocode shows just one example implementation of a BERT-based ensembled scoring algorithm, and alternative implementations of the process can be used in other embodiments.

FIG. 7 shows example pseudocode for a BERT-embedded vector quantization compression technique in an illustrative embodiment. In this embodiment, example pseudocode 700 is executed by or under the control of at least one processing system and/or device. For example, the example pseudocode 700 may be viewed as comprising a portion of a software implementation of at least part of automated communication data summarization system 105 of the FIG. 1 embodiment.

The example pseudocode 700 illustrates obtaining and/or receiving input in the form of sentence-wise split email text. For each sentence in the email, example pseudocode 700 computes one or more BERT embeddings using Distil_BERT (an example transformer model). Additionally, example pseudocode 700 generates and/or forms one or more clusters using a K-means technique based on the BERT embedding(s). For each cluster, example pseudocode 700 computes the centroid, and for each sentence in each cluster, the sentence score is set based on the distance between the sentence and the centroid. Additionally, the sentence score is then output and/or returned (to at least one user).

It is to be appreciated that this particular example pseudocode shows just one example implementation of a BERT-embedded vector quantization compression technique, and alternative implementations of the process can be used in other embodiments.

Figure 8:
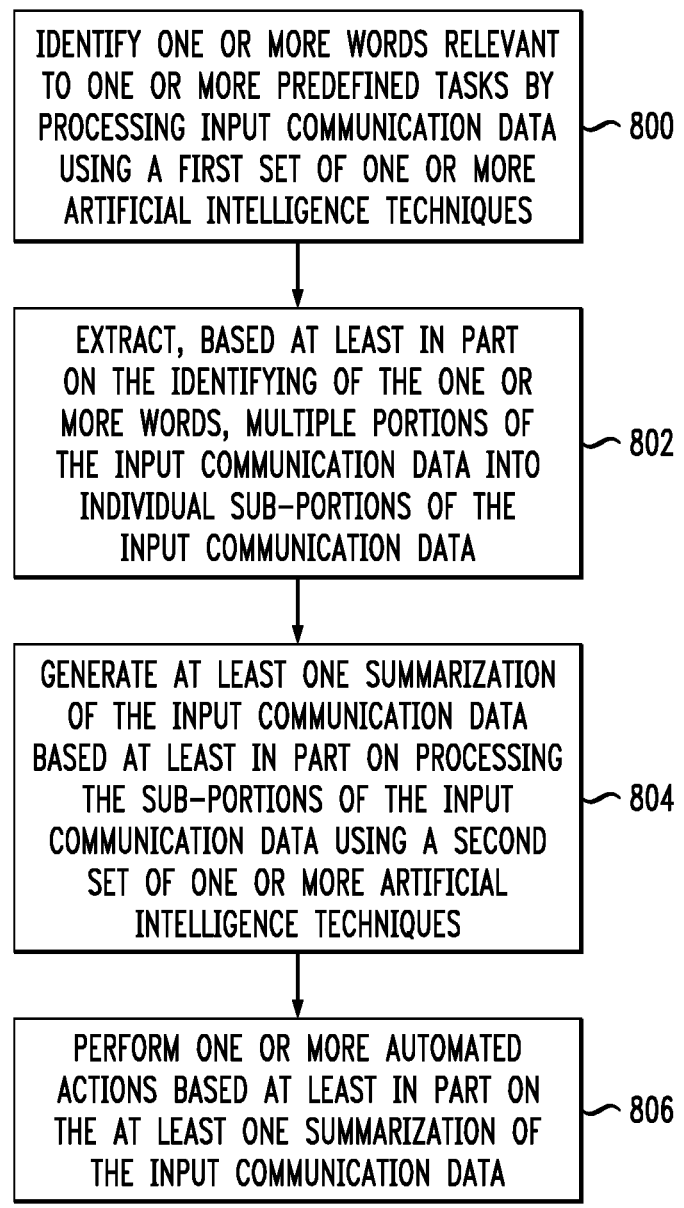
FIG. 8 is a flow diagram of a process for automated communication data summarization using artificial intelligence techniques in an illustrative embodiment.

FIG. 8 is a flow diagram of a process for automated communication data summarization using artificial intelligence techniques in an illustrative embodiment. It is to be understood that this particular process is only an example, and additional or alternative processes can be carried out in other embodiments.

In this embodiment, the process includes steps 800 through 806. These steps are assumed to be performed by the automated communication data summarization system 105 utilizing its elements 112, 114, 116 and 118.

Step 800 includes identifying one or more words relevant to one or more predefined tasks by processing input communication data (e.g., text data, multi-lingual data, and/or tabular data) using a first set of one or more artificial intelligence techniques. In at least one embodiment, identifying one or more words relevant to one or more predefined tasks by processing input communication data using a first set of one or more artificial intelligence techniques includes identifying one or more words relevant to one or more predefined tasks by processing input communication data using at least one keyword extraction technique in conjunction with one or more BERT embeddings. Additionally or alternatively, processing input communication data using a first set of one or more artificial intelligence techniques can include processing input communication data using one or more natural language processing techniques (e.g., at least one LDA model).

Step 802 includes extracting, based at least in part on the identifying of the one or more words, multiple portions of the input communication data into individual sub-portions of the input communication data.

Step 804 includes generating at least one summarization of the input communication data based at least in part on processing the sub-portions of the input communication data using a second set of one or more artificial intelligence techniques. In at least one embodiment, processing the sub-portions of the input communication data using a second set of one or more artificial intelligence techniques includes processing at least a portion of the sub-portions of the input communication data using one or more bidirectional encoder representation transformer-based ensembled scoring algorithms. Additionally or alternatively, processing the sub-portions of the input communication data using a second set of one or more artificial intelligence techniques can include weighting at least a portion of the sub-portions of the input communication data based at least in part of frequency, within each given sub-portion, of at least one of the one or more identified words relevant to the one or more predefined tasks.

Step 806 includes performing one or more automated actions based at least in part on the at least one summarization of the input communication data. In one or more embodiments, performing one or more automated actions includes automatically training at least one of the first set of one or more artificial intelligence techniques and the second set of one or more artificial intelligence techniques using at least a portion of the at least one summarization of the input communication data. Additionally or alternatively, performing one or more automated actions can include generating one or more control signals to control one or more external systems (e.g., a communication processing system, a transaction processing system, a shipping processing system, etc.).

As also detailed herein, at least one embodiment can include identifying one or more tables relevant to the one or more predefined tasks by processing the input communication data using at least a portion of the first set of one or more artificial intelligence techniques. In such an embodiment, generating at least one summarization of the input communication data includes generating at least one summarization comprising text data and tabular data. Additionally or alternatively, in an embodiment wherein the input communication data includes multi-lingual data, generating at least one summarization of the input communication can include generating at least one multi-lingual summarization.

Further, in one or more embodiments such as depicted in FIG. 8, the first set of one or more artificial intelligence techniques can include at least one artificial intelligence technique also included in the second set of one or more artificial intelligence techniques.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically generate communication data summarizations using artificial intelligence techniques. These and other embodiments can effectively overcome problems associated with error-prone and resource-intensive techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices.

For example, as detailed herein, a given container of cloud infrastructure illustratively comprises a Docker™ container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
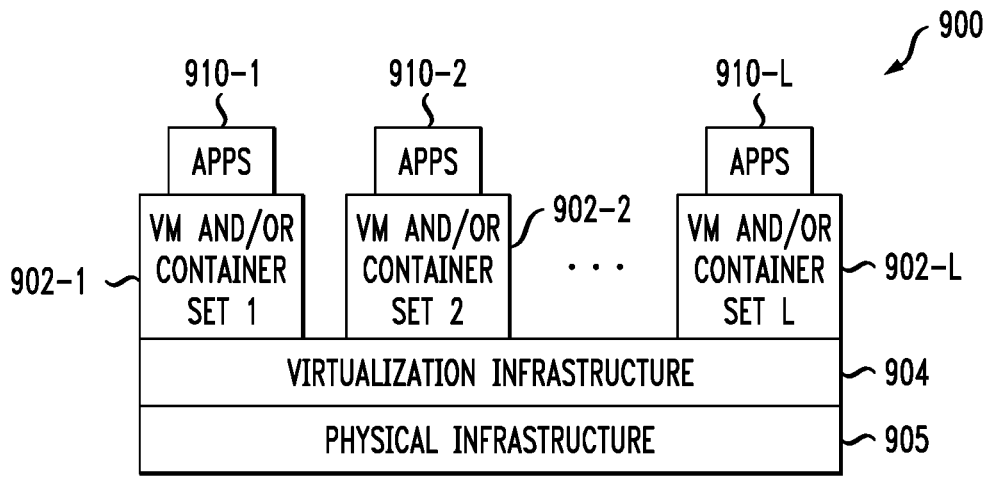
FIGS. 9 and 10 show examples of processing platforms that may be utilized to implement at least a portion of an information processing system in illustrative embodiments.
Figure 10:
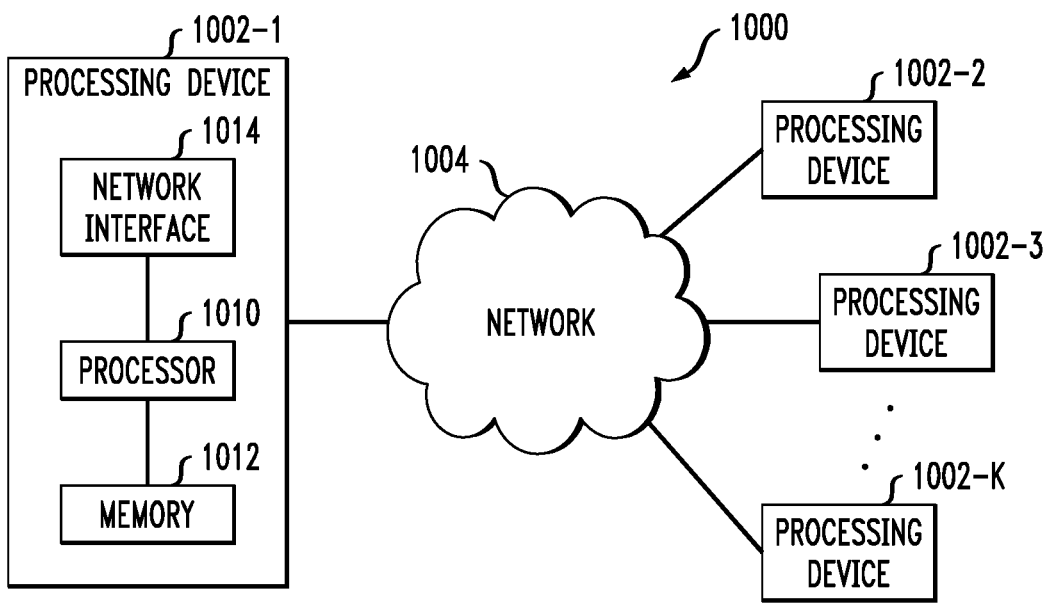

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more information processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a CPU, a GPU, a TPU, a microcontroller, an ASIC, a FPGA or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
determining one or more words, relevant to one or more predefined tasks, from one or more sets of communication data associated with the one or more predefined tasks, wherein determining one or more words comprises using one or more unigrams and one or more bigrams derived from the one or more sets of communication data, one or more artificial intelligence-based embeddings related to the one or more sets of communication data, and one or more similarity functions, wherein the one or more artificial intelligence-based embeddings related to the one or more sets of communication data comprise one or more bidirectional encoder representation transformer embeddings implemented in connection with words related to at least a portion of the one or more unigrams and the one or more bigrams, and wherein the one or more similarity functions comprise at least one cosine similarity function measuring similarity across at least a portion of the one or more artificial intelligence-based embeddings;

identifying at least a portion of the one or more words relevant to the one or more predefined tasks by processing input communication data using a first set of one or more artificial intelligence techniques;

extracting, based at least in part on the identifying of the at least a portion of the one or more words, multiple portions of the input communication data into individual sub-portions of the input communication data, wherein extracting comprises converting at least part of the input communication data to data in at least one markup language format, and extracting text data and tabular data from the data in the at least one markup language format;

generating at least one summarization of the input communication data based at least in part on processing at least a portion of the sub-portions of the input communication data using a second set of one or more artificial intelligence techniques, wherein generating at least one summarization of the input communication data comprises generating at least one text-based summarization of at least a portion of the text data and generating at least one additional summarization, at least in part in table format, of at least a portion of the tabular data, and wherein the second set of one or more artificial intelligence techniques comprises one or more bidirectional encoder representation transformer-based ensembled scoring algorithms; and performing one or more automated actions based at least in part on the at least one summarization of the input communication data;

wherein the method is performed by at least one processing device comprising a processor coupled to a memory.

2. The computer-implemented method of claim 1, wherein identifying one or more words relevant to one or more predefined tasks by processing input communication data using a first set of one or more artificial intelligence techniques comprises identifying one or more words relevant to one or more predefined tasks by processing input communication data using at least one keyword extraction technique in conjunction with one or more bidirectional encoder representation transformer embeddings.

3. The computer-implemented method of claim 1, wherein processing input communication data using a first set of one or more artificial intelligence techniques comprises processing input communication data using one or more natural language processing techniques, wherein the one or more natural language processing techniques comprise at least one Latent Dirichlet Allocation model.

4. The computer-implemented method of claim 1, wherein processing at least a portion of the sub-portions of the input communication data using a second set of one or more artificial intelligence techniques comprises weighting at least a portion of the sub-portions of the input communication data based at least in part on frequency, within each given sub-portion, of at least one of the one or more identified words relevant to the one or more predefined tasks.

5. The computer-implemented method of claim 1, wherein performing one or more automated actions comprises automatically training at least one of the first set of one or more artificial intelligence techniques and the second set of one or more artificial intelligence techniques using at least a portion of the at least one summarization of the input communication data.

6. The computer-implemented method of claim 1, further comprising:

identifying one or more tables relevant to the one or more predefined tasks by processing the input communication data using at least a portion of the first set of one or more artificial intelligence techniques.

7. The computer-implemented method of claim 1, wherein the input communication data comprise communication data in multiple languages, and wherein generating at least one summarization of the input communication data comprises generating at least one multi-lingual summarization.

8. The computer-implemented method of claim 1, wherein the first set of one or more artificial intelligence techniques comprises at least one artificial intelligence technique also comprised in the second set of one or more artificial intelligence techniques.

9. The computer-implemented method of claim 1, wherein the one or more unigrams and the one or more bigrams are derived from the one or more sets of communication data based at least in part on tokenizing and lemmatizing one or more words from the one or more sets of communication data.

10. A non-transitory processor-readable storage medium having stored therein program code of one or more software programs, wherein the program code when executed by at least one processing device causes the at least one processing device:
to determine one or more words, relevant to one or more predefined tasks, from one or more sets of communication data associated with the one or more predefined tasks, wherein determining one or more words comprises using one or more unigrams and one or more bigrams derived from the one or more sets of communication data, one or more artificial intelligence-based embeddings related to the one or more sets of communication data, and one or more similarity functions, wherein the one or more artificial intelligence-based embeddings related to the one or more sets of communication data comprise one or more bidirectional encoder representation transformer embeddings implemented in connection with words related to at least a portion of the one or more unigrams and the one or more bigrams, and wherein the one or more similarity functions comprise at least one cosine similarity function measuring similarity across at least a portion of the one or more artificial intelligence-based embeddings;
to identify at least a portion of the one or more words relevant to the one or more predefined tasks by processing input communication data using a first set of one or more artificial intelligence techniques;
to extract, based at least in part on the identifying of the at least a portion of the one or more words, multiple portions of the input communication data into individual sub-portions of the input communication data, wherein extracting comprises converting at least part of the input communication data to data in at least one markup language format, and extracting text data and tabular data from the data in the at least one markup language format;
to generate at least one summarization of the input communication data based at least in part on processing at least a portion of the sub-portions of the input communication data using a second set of one or more artificial intelligence techniques, wherein generating at least one summarization of the input communication data comprises generating at least one text-based summarization of at least a portion of the text data and generating at least one additional summarization, at least in part in table format, of at least a portion of the tabular data, and wherein the second set of one or more artificial intelligence techniques comprises one or more bidirectional encoder representation transformer-based ensembled scoring algorithms; and
to perform one or more automated actions based at least in part on the at least one summarization of the input communication data.

11. The non-transitory processor-readable storage medium of claim 10, wherein identifying one or more words relevant to one or more predefined tasks by processing input communication data using a first set of one or more artificial intelligence techniques comprises identifying one or more words relevant to one or more predefined tasks by processing input communication data using at least one keyword extraction technique in conjunction with one or more bidirectional encoder representation transformer embeddings.

12. The non-transitory processor-readable storage medium of claim 10, wherein processing at least a portion of the sub-portions of the input communication data using a second set of one or more artificial intelligence techniques comprises weighting at least a portion of the sub-portions of the input communication data based at least in part on frequency, within each given sub-portion, of at least one of the one or more identified words relevant to the one or more predefined tasks.

13. An apparatus comprising:
at least one processing device comprising a processor coupled to a memory;
the at least one processing device being configured:
to determine one or more words, relevant to one or more predefined tasks, from one or more sets of communication data associated with the one or more predefined tasks, wherein determining one or more words comprises using one or more unigrams and one or more bigrams derived from the one or more sets of communication data, one or more artificial intelligence-based embeddings related to the one or more sets of communication data, and one or more similarity functions, wherein the one or more artificial intelligence-based embeddings related to the one or more sets of communication data comprise one or more bidirectional encoder representation transformer embeddings implemented in connection with words related to at least a portion of the one or more unigrams and the one or more bigrams, and wherein the one or more similarity functions comprise at least one cosine similarity function measuring similarity across at least a portion of the one or more artificial intelligence-based embeddings;
to identify at least a portion of the one or more words relevant to the one or more predefined tasks by processing input communication data using a first set of one or more artificial intelligence techniques;
to extract, based at least in part on the identifying of the at least a portion of the one or more words, multiple portions of the input communication data into individual sub-portions of the input communication data, wherein extracting comprises converting at least part of the input communication data to data in at least one markup language format, and extracting text data and tabular data from the data in the at least one markup language format;
to generate at least one summarization of the input communication data based at least in part on processing at least a portion of the sub-portions of the input communication data using a second set of one or more artificial intelligence techniques, wherein generating at least one summarization of the input communication data comprises generating at least one text-based summarization of at least a portion of the text data and generating at least one additional summarization, at least in part in table format, of at least a portion of the tabular data, and wherein the second set of one or more artificial intelligence techniques comprises one or more bidirectional encoder representation transformer-based ensembled scoring algorithms; and to perform one or more automated actions based at least in part on the at least one summarization of the input communication data.

14. The apparatus of claim 13, wherein identifying one or more words relevant to one or more predefined tasks by processing input communication data using a first set of one or more artificial intelligence techniques comprises identifying one or more words relevant to one or more predefined tasks by processing input communication data using at least one keyword extraction technique in conjunction with one or more bidirectional encoder representation transformer embeddings.

15. The apparatus of claim 13, wherein the one or more unigrams and the one or more bigrams are derived from the one or more sets of communication data based at least in part on tokenizing and lemmatizing one or more words from the one or more sets of communication data.

\* \* \* \* \*